United States Patent Office 2,936,227
Patented May 10, 1960

2,936,227
METHOD FOR INHIBITING THE GROWTH OF PLANTS

Hans Gysin, Basel, and Enrico Knüsli, Riehen, near Basel, Switzerland, assignors to J. R. Geigy A.-G., Basel, Switzerland, a Swiss firm No Drawing. Application August 1, 1955
Serial No. 525,816

Claims priority, application Switzerland January 14, 1955

10 Claims. (Cl. 71—2.5)

The present invention is concerned with new compositions for influencing, and more particularly, inhibiting the growth of plants and with the methods of applying these compositions for influencing the growth of plants.

The surprising observation has been made that s-triazine-derivatives of the general formula:

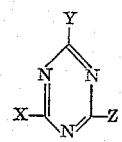

wherein

X represents a lower alkoxy, lower alkylmercapto, lower alkenyloxy, lower alkenylmercapto, lower nitroalkoxy, lower haloalkoxy, lower alkoxyalkoxy or lower hydroxyalkoxy radical, and Y and Z each represent chlorine, lower alkoxy, lower alkylmercapto, lower alkenyloxy, lower alkenylmercapto, lower nitroalkoxy, lower haloalkoxy, lower alkoxyalkoxy or lower hydroxyalkoxy radical, already in very low concentrations have an inhibitory influence on the growth of plants or even have a lethal action. Compounds of the general formula defined above are obtained easily, for example by reacting cyanuric chloride with lower aliphatic alcohols or mercaptans in the presence of sodium hydroxide or sodium bicarbonate. These compounds are excellently suitable as active ingredients for weed killers, both for the killing of weeds among cultivated plants (selective herbicides) as well as for the total elimination or inhibition of undesired plant growth (overall toxic herbicides). The word "weeds" here also means undesired cultivated plants, e.g. those which have been previously planted or those which are planted in neighbouring areas. In addition, the s-triazine-derivatives as defined above also exert other inhibitory influences on the plant growth and may be used for example, for defoliation, acceleration of ripeness by desiccation, e.g. of potato plants, also blossom thinning, retardation of blossoming, prolongation of the harvesting period and storing propensities. Further, the term "inhibitory influences" also comprises the compensation of conditions which otherwise occasionally stimulate plant growth in an unwanted direction, e.g. high temperature or rich fertilisation, so avoiding poor yields or poor quality of the desired agricultural or horticultural product from plants which are well developed in other regards.

As active ingredients, for example the following s-triazine derivatives can be used, the boiling points being given for the two new compounds:

2-chloro-4,6-dimethoxy-s-triazine
2,4,6-trimethoxy-s-triazine
2,4,6-triethoxy-s-triazine
2,4,6-tri-n-propoxy-s-triazine (B.P. 125–127°, 0.9 mm. pressure)
2,4,6-triallyloxy-s-triazine
2,4,6-tri-ethoxyethoxy-s-triazine (B.P. 149°, 0.001 mm. pressure)
2,4,6-tri-ethylmercapto-s-triazine Further examples of active ingredients are:

2,4-dichloro-6-methoxy-s-triazine
2-chloro-4,6-diethoxy-s-triazine
2,4,6-triisobutoxy-s-triazine
2,4,6-tri-n-hexyloxy-s-triazine
2,4,6-tri-(β-chloro-ethoxy)-s-triazine
2,4,6-tri-(β-nitro-ethoxy)-s-triazine
2,4,6-tri-methoxyethoxy-s-triazine
2,4,6-tri-allylmercapto-s-triazine and
2,4,6-tri-(β-hydroxy-ethoxy)-s-triazine The plant growth influencing compositions according to the invention are either solutions, emulsions, suspensions or dusts according to the intended use. All application forms however, must contain the active substance in fine distribution. In particular, when total destruction of plant growth, premature desiccation or defoliation are desired, the effect can be increased by the use of carriers which are phytotoxic themselves such as, e.g. high boiling minerals oils or chloro hydrocarbons. On the other hand, the selective inhibition of plant growth, e.g. selective weed killing, may be better attained by the use of indifferent carriers.

For example, mineral oil fractions such as kerosene or diesel oil, or coal tar oil and oils of vegetable or animal origin can be used as solvents for solutions which can be sprayed direct on to the plants. The active ingredients according to this invention are added to such oils direct or with the use of suitable auxiliary solvents such as xylene. Solutions in lower boiling or also in more expensive solvents such as alcohols, e.g. ethyl or isopropyl alcohol, ketones such as, e.g. acetone or cyclohexanone, hydrocarbons, e.g. benzene, toluene, xylene, tetrahydronaphthalene or alkylated naphthalenes and chlorinated hydrocarbons such as tetrachlorethane or ethylene chloride are less suitable for direct application but can be used for combinations with suitable emulsifiers for the production of concentrates which can be worked up for aqueous emulsions.

Aqueous application forms are made from emulsions and dispersion concentrates by adding water. The substances as such or dissolved in one of the above named solvents, are homogeneously incorporated into water, preferably by means of wetting or dispersing agents. Examples of cation active emulsifiers or dispersing agents are quaternary ammonium compounds, examples of anion active emulsifying agents are soap, soft soap, long chained aliphatic sulphuric acid monoesters, araliphatic sulphonic acids, long chained alkoxyacetic acids and examples of non-ionic emulsifiers are polyglycol ethers of fatty alcohols and polyethylene oxide condensation products. Also, concentrates can be produced consisting of active substance, emulsifier or dispersing agent and, if necessary, solvent. These latter are suitable for dilution with water.

Dusts can be produced by mixing or blending active substance with a solid carrier. Examples of such are: talcum, diatomaceous earth, kaolin, bentonite, calcium carbonate, boric acid, tricalcium phosphate or also sawdust, powdered cork, charcoal and other materials of vegetable origin. On the other hand, the carriers can be impregnated by means of a volatile solvent. Dusts and pastes can be suspended in water by the addition of wetting agents and protective colloids and so used as spraying agents.

Liquid concentrates for aqueous emulsions and wettable powders for aqueous suspensions can be prepared both from liquid and solid active compounds. However liquid active substances or solid active substances are more suitable for the preparation of liquid concentrates or of wettable powders of higher concentration respectively. The various forms of application can be adapted to the intended use in the usual way by the addition of substances which improve the distribution, the adhesive properties, resistance to rain, and, possibly, the resorption. Such substances are: e.g. fatty acids, resins, wetting agents, glue, casein or alginates. In the same way, the biological activity can be increased or amplified by the addition of substances which have a bactericidal or fungicidal action or of substances which also influence the growth of plants, as well as by combination with fertilisers.

In the following examples typical application agents and application forms are given (Examples 1 to 4).

To illustrate the range of application mentioned in the description, some chosen examples of laboratory and field tests and the results obtained are also given.

*Example 1*

20 parts of 2-chloro-4,6-dimethoxy-s-triazine and 80 parts of talcum are ground in a small mill to the greatest degree of fineness. The powder thus obtained can be used as a dust.

*Example 2*

20 parts of 2,4,6-tri-n-propoxy-s-triazine or 2,4,6-tri-alloxy-s-triazine are dissolved in a mixture of 48 parts of diacetonalcohol, 16 parts of xylene and 16 parts of an anhydrous high molecular condensation product of ethyleneoxide with high fatty acids. This concentrate can be diluted with water to give emulsions of any concentration desired.

*Example 3*

80 parts of 2,4,6-trimethoxy-s-triazine are mixed with 2-4 parts of a wetting agent, e.g. a sulphuric acid ester of an alkyl polyglycol ether, 1-3 parts by weight of a protective colloid, e.g. sulphite waste liquor and 15 parts of an inert solid carrier such as e.g. kaolin, bentonite, chalk or kieselguhr. The mixture is then ground very finely in a suitable mill. The powder obtained can be added to water and gives a suspension which is very stable.

*Example 4*

10 parts of 2-chloro-4,6-dimethoxy-s-triazine are dissolved in 90 parts of trichlorethylene or in high boiling organic solvent such as coal tar oil, diesel oil, spindle oil or aromatic solvent.

*Example 5*

For each compound to be tested and for control, a seed box was prepared as follows: in one half of the box 10 seeds of wheat, of mustard, of lucerne and of carrot were sown 3 cm. deep and in the other half 10 seeds of each of the above types of plants were sown 1 cm. deep. All the seed boxes were lightly watered. Then they were sprayed with 0.1 litre per sq. m. of 2% emulsions of the compounds to be tested which corresponds to 2 g. of active ingredient per sq. m.

After 21 days, the mustard and lucerne in the seed boxes treated with 2,4,6-triethoxy-s-triazine, 2,4,6-tri-n-propoxy-s-triazine and 2,4,6-triallyloxy-s-triazine had died. On the other hand, the wheat and carrots were undamaged.

*Example 6*

A 0.5% emulsion of 2,4,6-tri-n-propoxy-s-triazine sprayed on to oats and mustard plants about 10 cm. in height causes severe leaf burns. Also a 0.5% emulsion of 2-chloro-4,6-dimethoxy-s-triazine causes leaf burn on mustard plants.

*Example 7*

A dust containing 10% of 2,4,6-tri-n-propoxy-s-triazine and talcum as a carrier applied to 3-4 week old cotton plants caused severe leaf burn within 1-3 days after application. 2,4,6-tri-ethoxy-s-triazine and 2-chloro-4,6-dimethoxy-s-triazine had similar effects.

What we claim is:

1. A method of inhibiting the growth of plants which comprises bringing into contact with at least a part of a plant a composition consisting essentially of a solid powder and as active ingredient and in an amount sufficient to inhibit plant growth, 2,4,6-tri-n-propoxy-s-triazine.

2. A method of inhibiting the growth of plants which comprises bringing into contact with at least a part of a plant a composition consisting essentially of a solid powder and as active ingredient and in an amount sufficient to inhibit plant growth, 2,4,6-triethoxy-s-triazine.

3. A method of inhibiting the growth of plants which comprises bringing into contact with at least a part of a plant a composition consisting essentially of a surface active agent and as active ingredient and in an amount sufficient to inhibit plant growth, 2,4,6-tri-n-propoxy-s-triazine.

4. A method of inhibiting the growth of plants which comprises bringing into contact with at least a part of a plant a composition consisting essentially of a surface active agent and as active ingredient and in an amount sufficient to inhibit plant growth, 2,4,6-triethoxy-s-triazine.

5. A method of inhibiting the growth of plants which comprises bringing into contact with at least part of a plant a composition consisting essentially of a solid powder and as active ingredient and in an amount sufficient to inhibit plant growth, 2,4,6-tri(lower)alkoxy-s-triazine.

6. A method of inhibiting the growth of plants which comprises bringing into contact with at least part of a plant a composition consisting essentially of a solid powder and as active ingredient and in an amount sufficient to inhibit plant growth, 2-chloro-4,6-di(lower)alkoxy-s-triazine.

7. A method of inhibiting the growth of plants which comprises bringing into contact with at least part of a plant a composition consisting essentially of a solid powder and as active ingredient and in an amount sufficient to inhibit plant growth, 2,4,6-tri(lower)alkoxy(lower)alkoxy-s-triazine.

8. A method of inhibiting the growth of plants which comprises bringing into contact with at least part of a plant a composition consisting essentially of a solid powder and as active ingredient and in an amount sufficient to inhibit plant growth, 2,4-dichloro-6-lower alkoxy-s-triazine.

9. A method of inhibiting the growth of plants which comprises bringing into contact with at least part of a plant a composition consisting essentially of a solid powder and as active ingredient and in an amount sufficient to inhibit plant growth, 2-chloro-4,6-dimethoxy-s-triazine.

10. A method of inhibiting the growth of plants which comprises bringing into contact with at least part of a plant a composition consisting essentially of a solid powder and as active ingredient and in an amount sufficient to inhibit plant growth, 2,4,6-triethoxyethoxy-s-triazine.

References Cited in the file of this patent

UNITED STATES PATENTS

| | | |
|---|---|---|
| 2,392,067 | Schotte et al. | Jan. 1, 1946 |
| 2,510,564 | Dudley | Oct. 2, 1950 |
| 2,636,816 | Stewart | Apr. 28, 1953 |
| 2,682,541 | Kaiser | June 29, 1954 |
| 2,720,480 | Wolf | Oct. 11, 1955 |
| 2,749,231 | Ligett et al. | June 5, 1956 |

OTHER REFERENCES

Crocker in "Growth of Plants," Reinhold Publishing Corp., New York, 1948, page 216.